(12) United States Patent
Kim

(10) Patent No.: US 12,635,667 B2
(45) Date of Patent: May 26, 2026

---

(54) ANIMAL CONTROL DEVICE AND ANIMAL CONTROL SYSTEM INCLUDING THE SAME

(71) Applicant: Dae Sung Kim, Suwon-si (KR)

(72) Inventor: Dae Sung Kim, Suwon-si (KR)

( * ) Notice: Subject to any disclaimer, the term of this patent is extended or adjusted under 35 U.S.C. 154(b) by 69 days.

(21) Appl. No.: 18/019,242

(22) PCT Filed: Jul. 22, 2021

(86) PCT No.: PCT/KR2021/009493
§ 371 (c)(1),
(2) Date: Feb. 2, 2023

(87) PCT Pub. No.: WO2022/035083
PCT Pub. Date: Feb. 17, 2022

(65) Prior Publication Data
US 2023/0284592 A1    Sep. 14, 2023

(30) Foreign Application Priority Data
Aug. 11, 2020    (KR) ........................ 10-2020-0100317

(51) Int. Cl.
*A01K 15/02*    (2006.01)
*A01K 29/00*    (2006.01)
*B68B 1/10*    (2006.01)

(52) U.S. Cl.
CPC ............ *A01K 15/02* (2013.01); *A01K 29/005* (2013.01); *B68B 1/10* (2013.01)

(58) Field of Classification Search
CPC .......... G02B 27/017; G02B 2027/0178; G02B 27/0172; G02B 27/0179; G02B 2027/014; G02B 2027/0181–0187; A01K 13/006; A01K 15/02; A01K 15/021; A01K 15/023; A01K 15/027; A01K 15/04; A01K 29/00; A01K 29/005; A01K 27/001; A01K 27/009; G02C 7/10; G02C 7/101; G02C 7/102; G02C 7/104; G02C 7/16; G02C 11/10; G02C 11/12; A61H 2205/024
(Continued)

(56) References Cited

U.S. PATENT DOCUMENTS

| | | | |
|---|---|---|---|
| 4,261,293 A | 4/1981 | Djernes | |
| 6,311,645 B1 | 11/2001 | Brown | |
(Continued)

FOREIGN PATENT DOCUMENTS

| | | | | |
|---|---|---|---|---|
| CN | 107846869 A | * | 3/2018 | ........... A01K 29/005 |
| CN | 109392754 A | * | 3/2019 | |
(Continued)

OTHER PUBLICATIONS

International Search Report mailed Nov. 2, 2021 for PCT/KR2021/009493.

*Primary Examiner* — Joshua D Huson
*Assistant Examiner* — Brook Victoria Schmid
(74) *Attorney, Agent, or Firm* — CANTOR COLBURN LLP

(57) ABSTRACT

An animal control device includes a speed sensor including a sensing module configured to measure a moving speed of an animal and a processor, and a visual field blocker configured to block a visual field of the animal, and having a light transmittance which is controllable by the processor according to the moving speed measured by the sensing module.

1 Claim, 12 Drawing Sheets

(58) Field of Classification Search
USPC ..................................... 119/836; 54/11, 80.2
See application file for complete search history.

(56) References Cited

U.S. PATENT DOCUMENTS

| | | | |
|---|---|---|---|
| 11,950,571 B2 * | 4/2024 | Wernimont .............. | H04Q 9/00 |
| 2006/0155172 A1 * | 7/2006 | Rugg ..................... | A61D 17/00 |
| | | | 600/300 |
| 2008/0236514 A1 * | 10/2008 | Johnson ............... | A01K 15/021 |
| | | | 340/573.3 |
| 2010/0321182 A1 * | 12/2010 | Wangrud .............. | G01S 5/0072 |
| | | | 340/539.13 |
| 2013/0211773 A1 * | 8/2013 | Loeschinger ........... | G01B 7/14 |
| | | | 702/152 |
| 2016/0058090 A1 * | 3/2016 | Leung ................... | A42B 1/008 |
| | | | 119/712 |
| 2017/0263032 A1 * | 9/2017 | Cricri ................... | H04W 4/023 |
| 2018/0228130 A1 * | 8/2018 | Van Curen .......... | A01K 15/023 |
| 2018/0249680 A1 * | 9/2018 | Van Curen .......... | A01K 15/022 |
| 2019/0037806 A1 | 2/2019 | Peper, Jr. et al. | |
| 2019/0068850 A1 * | 2/2019 | Peper, Jr. .............. | H04N 23/54 |
| 2019/0324274 A1 * | 10/2019 | Kalinowski .......... | G02F 1/0126 |

FOREIGN PATENT DOCUMENTS

| | | | | |
|---|---|---|---|---|
| CN | 109675171 A | * | 4/2019 | |
| CN | 110852198 A | * | 2/2020 | |
| DE | 202014001377 U1 | * | 5/2014 | .......... A01K 13/006 |
| DE | 102014001041 A1 | * | 7/2015 | .......... A01K 15/021 |
| GB | 2489284 A | * | 9/2012 | .......... A01K 15/021 |
| GB | 2520806 A | * | 6/2015 | .......... A01K 29/005 |
| KR | 10-2011-0073152 A | | 6/2011 | |
| KR | 20120115640 A | * | 10/2012 | |
| KR | 10-2014-0046646 A | | 4/2014 | |
| KR | 20140046646 A | * | 4/2014 | |
| KR | 10-2018-0002335 A | | 1/2018 | |
| NL | 1019842 C6 | * | 7/2003 | |
| WO | WO-2006007643 A1 | * | 1/2006 | .......... A01K 15/023 |
| WO | WO-2010009509 A1 | * | 1/2010 | .......... A01K 11/008 |
| WO | WO-2018082227 A1 | * | 5/2018 | .......... A01K 29/005 |
| WO | WO-2020243436 A1 | * | 12/2020 | .......... A01K 15/023 |

* cited by examiner

ANIMAL CONTROL DEVICE AND ANIMAL CONTROL SYSTEM INCLUDING THE SAME

TECHNICAL FIELD

The present disclosure relates to an animal control device and an animal control system including the same.

More particularly, the present disclosure relates to a device and system for controlling an animal, for example, a riding horse, using a sensor, and more particularly, to a device and system for controlling a horse by detecting an unexpected situation in which a horse is excited using a sensor.

BACKGROUND ART

Horses are one of the most important livestock for human beings. A long time ago, horses were only hunting targets for human food, but they have been used for riding, pulling carts, carrying loads, or the like because they have strength and endurance and are easily tamed by human beings because of mild disposition. Recently, horses are livestock mainly used for leisure sports such as horseback riding and the like.

Horses have a level of intelligence that can be trained by repeated learning. On the other hand, horses are timid and tend to be easily excited, so that it is very important to train horses that can be controlled according to human intentions. Further, even a horse that is sufficiently trained is often very excited and out of control when an unexpected situation occurs. Further, horses have a strong hierarchical sense, and thus may not be controlled when they are not trained to organize the hierarchical order with a jockey or a rider. In this case, the rider (or jockey) may be in great danger.

On the other hand, horseback riding was considered as a hobby for the nobility, but has recently become popular as ordinary people begin to learn horseback riding as a hobby as a national income increases. Accordingly, the demand for riding horses that are so well trained that even beginners can ride is increasing.

DISCLOSURE

Technical Problem

The domestication of horses is estimated to have begun around 2500 B.C. As described above, humans have recognized the usefulness of horses for a very long time and have domesticated horses. However, for a long time, the way humans have tamed horses has relied purely on repetitive learning and, thus, the training period for horses tends to be quite long. For this reason, well-trained horses are traded at very high prices.

Therefore, it is not easy to train a horse and, also, even a well-trained horse may be excited in an unexpected situation because of the above-described basic tendency of horses, or may not recognize a rider as an owner, which may often lead to an accident. In addition, accidents that occur during horseback riding often lead to serious injury.

In particular, since it is impossible for ordinary people, that is, riders who want to start horseback riding as a sport or an experience rather than a professional jockey to control an excited horse, such a difficulty is a major factor that increases an entry barrier for an equestrian sport and makes the equestrian sport be recognized as a dangerous sport. In this respect, there is an urgent demand for a safety device for raising well-trained horses and controlling horses in an unexpected situation in the case where ordinary people ride trained horses as a sport.

The actions taken by an excited horse may be mainly divided into three actions. The first action is sudden galloping of a horse, and the second action is standing up of a horse. Finally, the third action is course deviation without following the instruction of a rider.

Aspects of the present disclosure provide a device for controlling a horse when the horse is excited or does not follow the instruction of a jockey or a rider.

Aspects of the present disclosure also provide a horse control system using a device for controlling a horse when the horse is excited or does not follow the instruction of a jockey or a rider.

Aspects of the present disclosure also provide a method for controlling a horse when the horse is excited or does not follow the instruction of a jockey or a rider.

It should be noted that aspects of the present disclosure are not limited to the above-mentioned aspects, and other unmentioned aspects of the present disclosure will be clearly understood by those skilled in the art from the following descriptions.

Technical Solution

According to one embodiment of the present disclosure, there is provided animal control device comprising: a sensor configured to detect movement of an animal; and a visual field blocker disposed to block a visual field of the animal, and having a light transmittance which is controlled according to a signal detected by the sensor.

The sensor may comprise a speed sensor to measure a moving speed of the animal.

In this case, when the moving speed of the animal is above or greater than a reference value, the animal's visual field may be restricted by reducing the light transmittance of the visual field blocker.

In addition, the sensor may be configured to perform a first step of reducing the light transmittance of the visual field blocker when the measured speed is above or greater than the reference value; further reducing the light transmittance of the visual field blocker when the speed measured again after an elapse of a predetermined period of time in the first step is above or greater than the reference value; and increasing the light transmittance of the visual field blocker when the speed measured again after the elapse of the predetermined period of time in the first step is less than or below the reference value.

Alternatively, the sensor may be configured to perform a first step of reducing the light transmittance of the visual field blocker when the measured speed is above or greater than a first reference value; and further reducing the light transmittance of the visual field blocker when the speed measured again after the first step is above or greater than a second reference value greater than the first reference value.

In some embodiments, the sensor may comprise a first sensor and a second sensor attached to different positions.

In this case, the first sensor and the second sensor may detect positions between each other, and when a level difference above a reference value occurs between the first sensor and the second sensor, the animal's visual field may be restricted by reducing the light transmittance of the visual field blocker.

In this case, the visual field blocker may be divided into a plurality of areas in which the light transmittance can be controlled independently of each other, and when a level difference above a reference value occurs between the first sensor and the second sensor, the visual field blocker may completely block a visual field of other areas except a part of a lower area of the animal's visual field.

In addition, the sensor may comprise a first sensor and a second sensor attached to different positions, and each of the first sensor and the second sensor may comprise an inclination sensor.

In this case, when a difference above a reference value occurs between an inclination measured by the first sensor and an inclination measured by the second sensor, the animal's visual field may be restricted by reducing the light transmittance of the visual field blocker.

In some embodiments, the sensor may comprise an inclination sensor.

In this case, when an inclination measured by the sensor is above a reference value, the animal's visual field may be restricted by reducing the light transmittance of the visual field blocker.

In some embodiments, the sensor comprises a position detection sensor, and when a position measured by the sensor is out of a preset permitted area, the animal's visual field may be restricted by reducing the light transmittance of the visual field blocker.

In this case, the visual field blocker may be divided into a plurality of areas in which the light transmittance can be controlled independently of each other, and when the sensor deviates from one side of the permitted area, the visual field blocker may completely block a visual field of other areas except a part of the other side of the animal's visual field.

In addition, when the sensor deviates from the other side of the permitted area, the visual field blocker may completely block a visual field of other areas except a part of one side of the animal's visual field.

The details of other embodiments are included in the following description and the accompanying drawings.

Advantageous Effects

In accordance with embodiments of the present disclosure, when a horse takes a specific action, it is possible to at least partially block a horse's visual field to control the horse and calm down the horse.

Advantageous effects according to the present disclosure are not limited to those mentioned above, and various other advantageous effects are included herein.

MODES OF THE INVENTION

Figure 1:
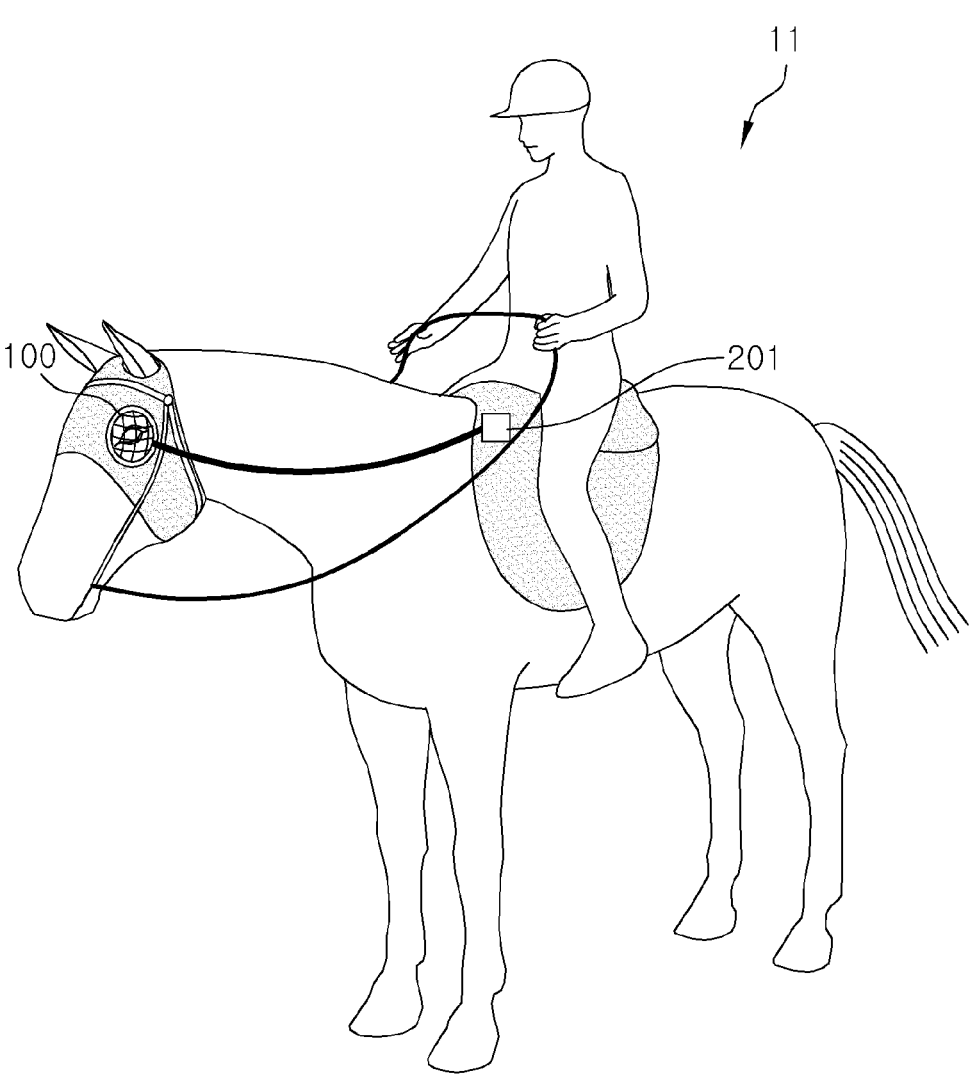
FIGS. 1 and 2 are schematic views of a horse wearing an animal control device according to an embodiment of the present disclosure.

Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the invention to those skilled in the art, and the present disclosure will only be defined by the appended claims. That is, various changes may be made to the embodiments of the present disclosure. However, it is to be understood that the embodiments described below are not intended to limit the embodiments of the present disclosure, and include all modifications, equivalents, and substitutions thereto.

Unless defined otherwise, all technical and scientific terms used herein have the same meaning as commonly understood by one of ordinary skill in the art to which this invention belongs. Further, unless defined otherwise, all terms defined in generally used dictionaries may not be overly interpreted.

As used herein, the term "and/or" includes any and all combinations of one or more of the associated listed items. As used herein, the singular forms "a", "an" and "the" are intended to include the plural forms as well, unless the context clearly indicates otherwise. It will be further understood that the terms "comprise" and/or "comprising," when used in this specification, specify the presence of stated components, but do not preclude the presence or addition of one or more other components. A numerical range expressed using 'to' indicates a numerical range including values stated before and after 'to' as the lower and upper limits. A numerical range expressed using 'about' or 'approximately' indicates a value or a numerical range within 20% of the value or the numerical range stated after 'about' or 'approximately'.

In the drawings, components may be enlarged or reduced in size, thickness, width, length, and the like for convenience and clarity of description, and thus the present disclosure is not limited to the illustrated form.

Spatially relative terms, such as "above," "upper," "on," "below," "beneath," "lower," and the like, may be used herein for ease of description to describe one element or feature's relationship to another element(s) or feature(s) as illustrated in the figures. It will be understood that the spatially relative terms are intended to encompass different orientations of the device in use in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below.

Hereinafter, the present disclosure will be described in detail with reference to the accompanying drawings.

Figure 2:
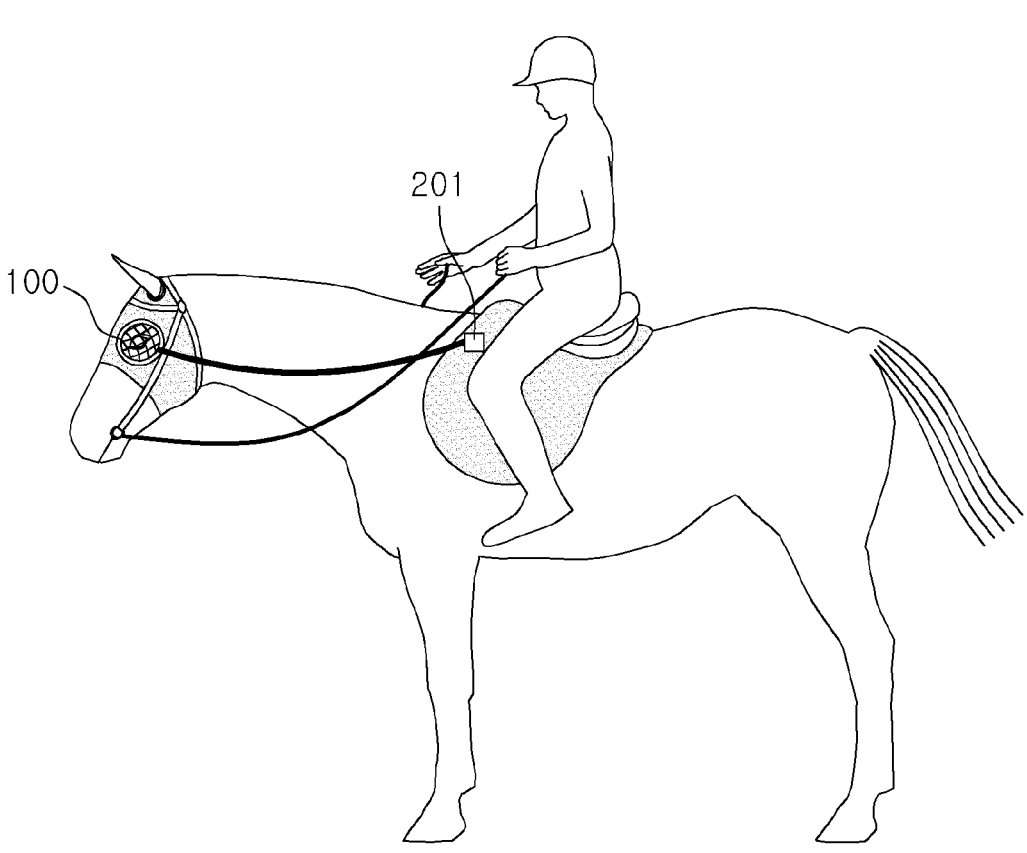
Figure 3:
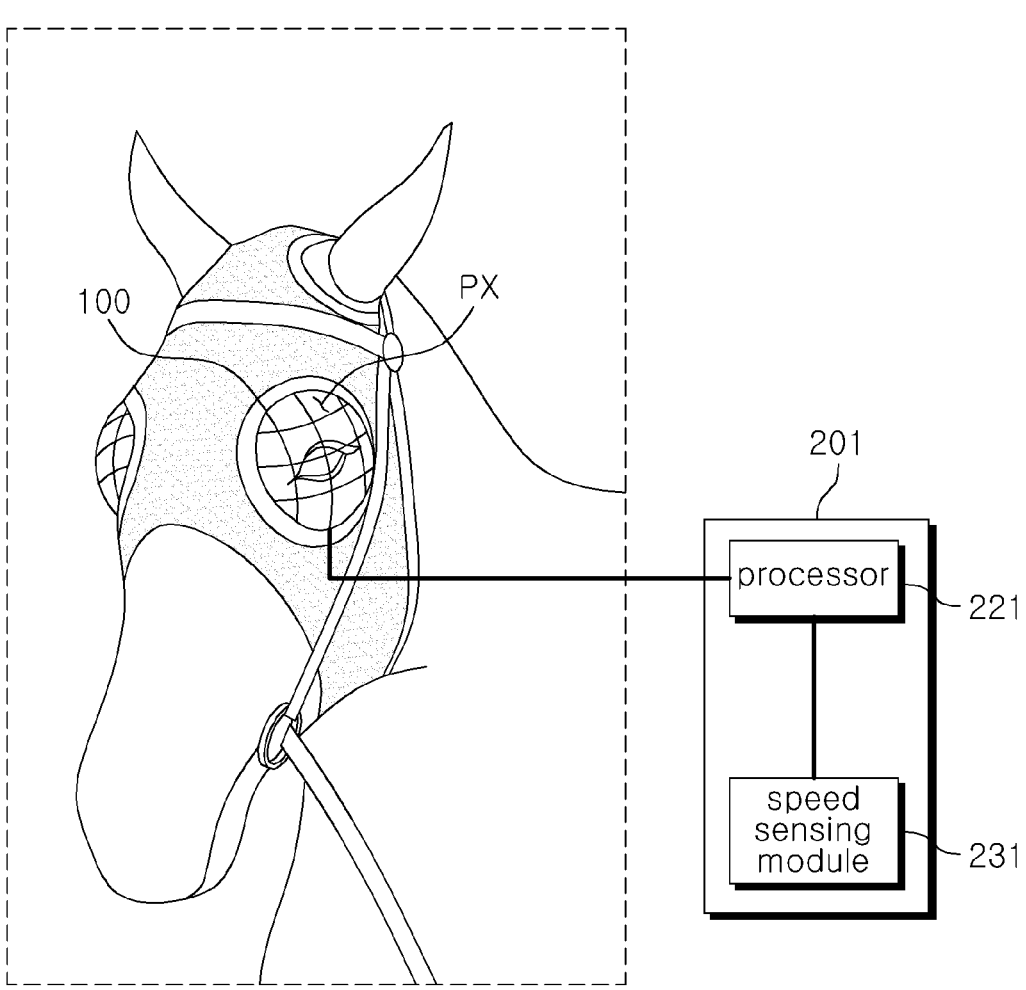
FIG. 3 is a diagram illustrating the configuration of the animal control device according to the embodiment of FIG. 1.
Figure 4:
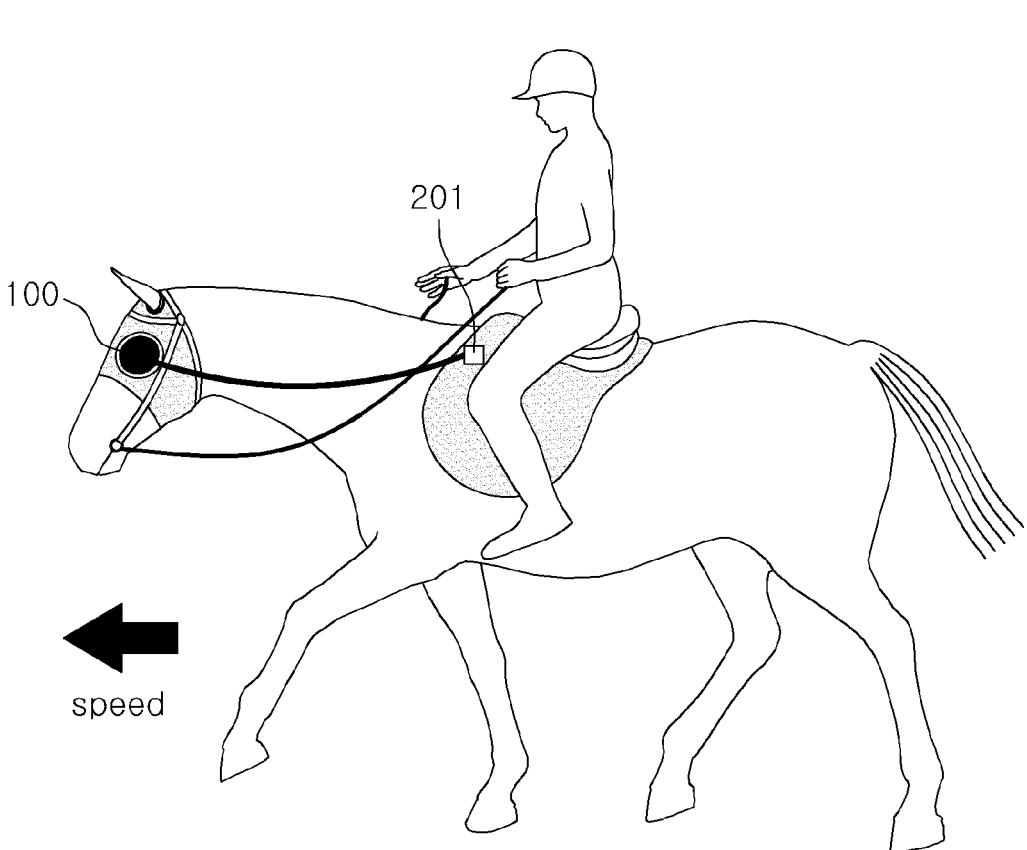
FIG. 4 is a diagram illustrating the operation of the animal control device according to a first embodiment of the present disclosure.
Figure 5:
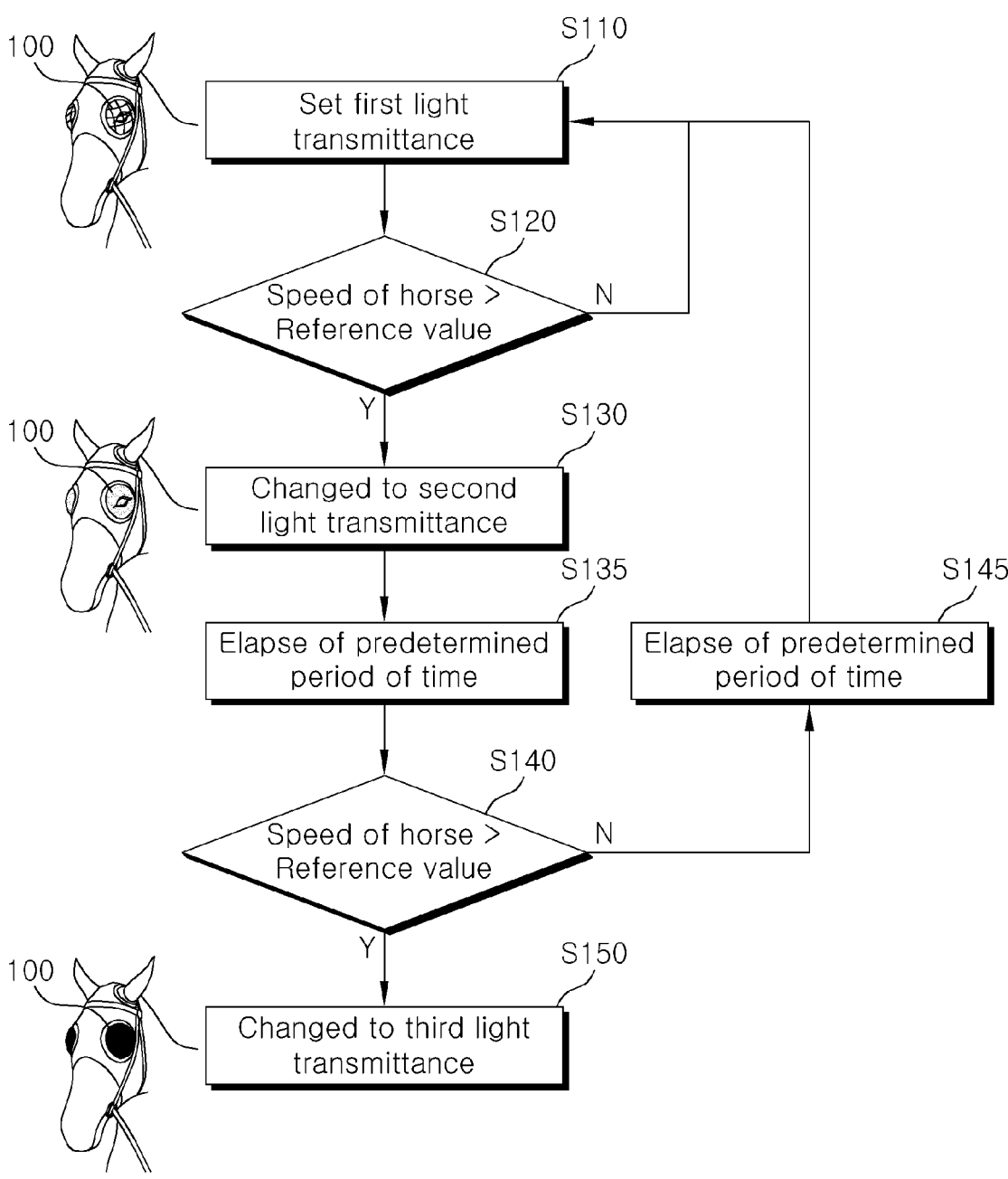
FIG. 5 shows a light transmittance control algorithm of a processor of the animal control device according to the embodiment of FIG. 4.

FIGS. 1 and 2 are schematic views of a horse wearing an animal control device according to an embodiment of the present disclosure. FIG. 3 is a diagram illustrating the configuration of the animal control device according to the embodiment of FIG. 1. FIG. 4 is a diagram illustrating the operation of the animal control device according to a first embodiment of the present disclosure. FIG. 5 shows a light transmittance control algorithm of a processor of the animal control device according to the embodiment of FIG. 4.

Referring to FIGS. 1 to 5, an animal control device 11 according to the present embodiment includes a sensor 201 for detecting movement of an animal and a visual field blocker 100 controlled by the sensor 201. The animal control device 11 according to the present disclosure may be used to train, tame, or control animals. However, the present disclosure is not limited thereto.

Hereinafter, a case where a control target of the animal control device 11 is a horse will be described as an example, but the present disclosure is not limited thereto and various animals that are controllable by the present disclosure may be the target. For example, the present disclosure may be applied to livestock such as donkeys, sheep, and goats, or may be used, if necessary, for wild animals such as wolves and tigers, or for pets such as dogs, cats, and rabbits.

The visual field blocker 100 may be disposed on the animal's visual field to cover the animal's eyes. For example, when it is applied to a horse having a visual field radius of about 300 degrees or more, it may be disposed to cover the entire visual field. The visual field blocker 100 may be integrally combined with a mask to be worn on the head of an animal, but the present disclosure is not limited thereto. In another embodiment, the visual field blocker 100 may be provided in the form of glasses, or may be provided in the form of a component that is attachable to and detachable from a mask, such as conventional blinkers or the like.

The visual field blocker 100 may be configured to control the amount of transmitted light, i.e., the light transmittance, according to an electrical signal. For example, the visual field blocker 100 may include a liquid crystal lens or the like. The liquid crystal lens may include a liquid crystal that behaves according to an electrical signal to control the light transmittance. For example, twisted nematic (TN) liquid crystal, super twisted nematic (STN) liquid crystal, polymer dispersed liquid crystal (PDLC), or the like may be used according to the initial arrangement and type of the liquid crystal. In some embodiments, the liquid crystal lens may be divided into a plurality of areas PX. Accordingly, the light transmittance may be independently controlled for each corresponding area PX. The area PX may mean an independently controlled area such as a pixel.

However, the present disclosure is not limited thereto, and may have any configuration as long as it is possible to change the light transmittance of the entire area or a partial area (i.e., partial area PX) in response to the electrical signal provided by the sensor 201 to be described later, and also possible to apply a high light transmittance or substantially block the light transmittance, to thereby selectively secure, block, or partially block the visual field of a target animal. In another embodiment, the visual field blocker 100 may be a device capable of physically blocking an animal's visual field by moving a shield according to an electrical signal.

The initial light transmittance of the visual field blocker 100 may be about 90% or more, or about 91% or more, or about 92% or more, or about 93% or more, or about 94% or more, or about 95% or more, or about 96% or more, or about 97% or more, or about 98% or more, or about 99% or more, or 100%. The 'initial' means a state in which the power of the visual field blocker 100 is cut off, or a state in which a separate signal is not applied.

The sensor 201 may detect the movement of a target animal. In an exemplary embodiment, the sensor 201 may be a speed sensor that is attached to a target animal to measure the target animal's speed, for example, an instantaneous speed. The sensor 201 may be attached to a saddle or the like and move together with the movement of the animal, but the present disclosure is not limited thereto.

The sensor 201 may include a sensing module 231 and a processor 221. The sensing module 231 means a module for detecting a desired state by a unique method, and the processor 221 may perform a predetermined algorithm based on the measurement result of the sensing module 231, and transmit the signal outputted as a result thereof to the visual field blocker 100. The processor 221 may include a central processing unit (CPU), a micro processor unit (MPU), a micro controller unit (MCU), or any type of processor known in the art. The sensor 201 and the visual field blocker 100 may communicate with each other in a wired or wireless manner.

In an exemplary embodiment, the sensing module 231 may detect the moving speed of a horse, and the processor 221 may compare the measured speed of the horse with a predetermined reference speed, and decrease the light transmittance of the visual field blocker 100 when the measured speed of the horse is higher than the reference speed. On the other hand, when the measured speed of the horse is lower than the reference speed, the light transmittance of the visual field blocker 100 may be increased again.

For example, the reference speed may be about 30 km/h, or about 32 km/h, or about 34 km/h, or about 36 km/h, or about 38 km/h or about 40 km/h. When a horse moves at a speed lower than the reference speed, the visual field blocker 100 may sufficiently transmit light, and may not restrict the horse's visual field. On the other hand, when a horse moves at a speed exceeding the reference speed, the visual field blocker 100 may decrease light transmittance. The decrease in light transmittance may be gradual or continuous.

Specifically, a first light transmittance is set (step S110). The first light transmittance may mean the light transmittance of the visual field blocker 100 in the above-described initial state.

When a horse moves, the sensor 201 measures the speed of the horse (step S120). When the speed of the horse exceeds the reference speed, for example, 35 km/h, the light transmittance of the visual field blocker 100 may be changed to a second light transmittance (step S130). The second light transmittance may be lower than the first light transmittance. For example, the first light transmittance may be about 99%, and the second light transmittance may be about 50%, but the present disclosure is not limited thereto. The light transmittance may be changed gradually in a continuous manner, or may be changed gradually in a discontinuous manner.

As the light transmittance of the visual field blocker 100 placed on the horse's visual field decreases, the horse's visual field may become dark, and it may be expected that the horse calms down and slows down a speed or a velocity according to changes in the surrounding environment.

On the other hand, in a state where the horse's speed does not exceed the reference speed, the first light transmittance may be maintained, and the sensor 201 or the processor 221 may repeatedly execute the step of comparing the horse's speed with the reference speed at predetermined time intervals.

After the light transmittance of the visual field blocker 100 is set to the second light transmittance, a step of waiting or delaying a predetermined period of time (step S135) may be further included. When the horse's speed exceeds the reference speed, the light transmittance of the visual field blocker 100 changes (step S130) and, thus, the horse calms down a little bit, but the speed may not be immediately changed to the reference speed or lower. Therefore, it may be configured to execute a subsequent step after waiting for a predetermined period of time. The predetermined period of time may be about 5 seconds, or about 6 seconds, or about 7 seconds, or about 8 seconds, or about 9 seconds, or about 10 seconds, or about 15 seconds, or about 20 seconds.

Then, the sensor 201 measures the horse's speed again (step S140). Further, when it is detected that the horse's speed still exceeds the reference speed, that is, 35 km/h, the light transmittance of the visual field blocker 100 may be changed to a third light transmittance (step S150). The third light transmittance may be lower than the second light transmittance. For example, the third light transmittance may be about 10%, or about 5%, or about 1%, or 0%, that is, a state in which light transmission is completely blocked.

If the horse does not calm down and still moves at a high speed even though the visual field blocker 100 has the second light transmittance, which is sufficiently dark, the visual field may be changed to be darker. For example, the movement may be forcibly stopped by completely blocking the visual field.

On the other hand, when it is measured that the horse's speed is decreased to the reference speed or lower after the visual field blocker 100 has the second light transmittance, which is dark, the light transmittance may be increased. For example, the visual field blocker 100 may be changed to the first light transmittance that is the initial state.

In some embodiments, even if it is determined that the horse's speed is the reference speed or lower (step S140), the change to the first light transmittance may be performed after waiting for a predetermined period of time (step S145). The increases and decreases in speed may be repeated when the horse is excited. Therefore, the visual field blocker 100 may be configured to restore the initial light transmittance after a sufficient period of time, for example, about 10 seconds, or 11 seconds, or about 12 seconds, or about 13 seconds, or about 14 seconds, or about 15 seconds, or about 50 16 seconds, or about 17 seconds, or about 18 seconds, or about 20 seconds, or about 25 seconds, or about 30 seconds, elapses from the decrease of the horse's speed below the reference speed.

As described above, in an unexpected situation, for example, when a horse is excited, it may be difficult for a jockey or a rider to control the horse. Therefore, as in the present embodiment, even if a rider or the like does not take a separate action to calm down the horse, it is possible to detect the horse's movement using the sensor 201, and calm down the horse by controlling the light transmittance of the visual field blocker 100 based thereon. In particular, it is possible to effectively calm down an animal such as a horse that is highly sensitive to the visual field by adopting the configuration of the present embodiment.

Further, in the case of a training horse or the like, the speed of the horse needs to be limited. Since a rider is not an expert jockey, it may be desirable to move at a speed between approximately 10 km/h and 20 km/h. Therefore, it may be very effective to control the visual field blocker 100 based on the speed information as in the present embodiment.

In addition, the horse has a level of intelligence at which behaviors may be learned by repeated performance, and thus may be trained by learning the correlation between the speed and light transmittance of the visual field blocker 100. For example, a horse may be trained to learn that the visual field becomes dark when it runs at a predetermined speed or higher, and thus may learn not to run at a speed exceeding a predetermined reference speed.

Although not illustrated in the drawing, in another embodiment, the sensor 201 may be an acceleration sensor that is attached to a target animal to measure acceleration of the target animal, for example, instantaneous acceleration or average acceleration. For example, the sensing module 231 of the sensor 201 may detect the horse's acceleration, and the processor 221 may compare the measured horse's acceleration with a predetermined reference acceleration and decrease the light transmittance of the visual field blocker 100 when the measured horse's acceleration is higher than the reference acceleration. On the other hand, when the measured acceleration of the horse is lower than the reference acceleration, the light transmittance of the visual field blocker 100 may be increased again.

Hereinafter, other embodiments of the present disclosure will be described. However, the description of the configuration that may be understood to be the same as or similar to the animal control device according to the above-described first embodiment will be omitted, and this will be easily understood by those skilled in the art from the accompanying drawings.

Figure 6:
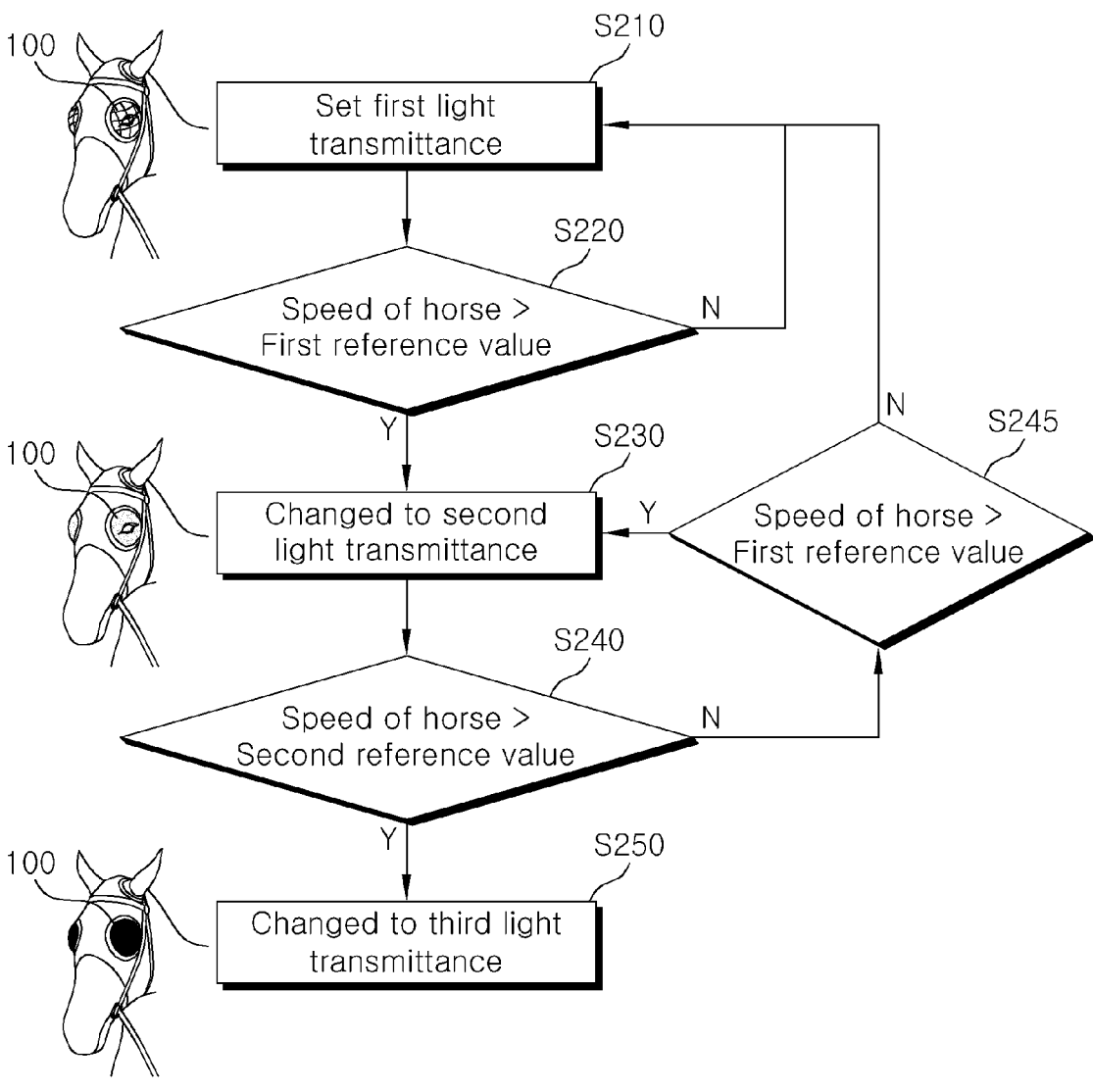
FIG. 6 is a diagram illustrating a light transmittance control algorithm of a processor of an animal control device according to a second embodiment of the present disclosure.

FIG. 6 is a diagram illustrating a light transmittance control algorithm of a processor of an animal control device according to a second embodiment of the present disclosure.

Referring to FIG. 6, the animal control device according to the present embodiment includes a speed sensor for measuring the speed (or velocity) or acceleration of an animal, similarly to the above-described first embodiment, but is different from the animal control device 11 according to the embodiment of FIG. 5 or the like in that the algorithm performed by the processor is different.

Specifically, an animal control method according to the present embodiment may include a first reference speed and a second reference speed.

In an exemplary embodiment, the first light transmittance is set (step S210). Since the first light transmittance has been described above, redundant description thereof will be omitted.

When a horse moves, the sensor may measure the speed of the horse (step S220). When the speed of the horse exceeds the first reference speed, for example, km/h, the light transmittance of the visual field blocker may be changed to the second light transmittance (step S230). Since the second light transmittance has been described above, redundant description thereof will be omitted.

On the other hand, in a state where the horse's speed does not exceed the first reference speed, the first light transmittance may be maintained, and the sensor or the processor may repeatedly execute the step of comparing the horse's speed with the first reference speed at predetermined time intervals.

After the light transmittance of the visual field blocker is set to the second light transmittance, the sensor may still measure the horse's speed. When it is measured that the horse's speed exceeds the second reference speed (step S240), the light transmittance of the visual field blocker may be changed to the third light transmittance (step S250). The second reference speed may be higher than the first reference speed. For example, the second reference speed may be about 38 km/h, about 40 km/h, or about 42 km/h.

That is, the animal control method according to the embodiment of FIG. 5 described above controls the light transmittance based on one reference value and the elapse of a predetermined period of time, whereas the animal control method according to the present embodiment controls the light transmittance based on a plurality of reference values and intervals therebetween.

For example, when it is determined that the horse's speed is lower than the second reference speed (step S240) and higher than the first reference speed (step S245), that is, when the horse moves at a speed between the first reference speed and the second reference speed, for example, 36 km/h, the light transmittance of the visual field blocker may still be maintained at the second light transmittance.

For another example, when it is measured that the horse's speed is lower than the first reference speed as well as the second reference speed (step S245), that is, when the horse's speed is abruptly decreased because the light transmittance is changed to the second light transmittance, the light transmittance of the visual field blocker may be changed to the first light transmittance.

Figure 7:
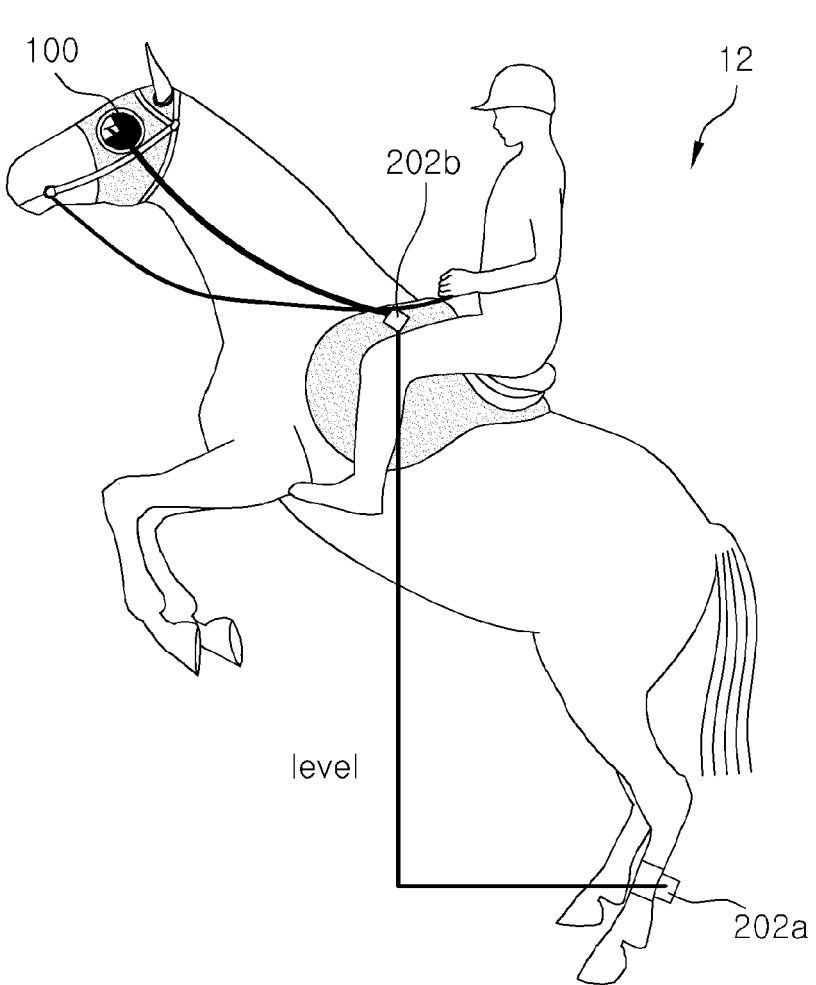
FIG. 7 is a diagram illustrating the operation of an animal control device according to the third embodiment of the present disclosure.
Figure 8:
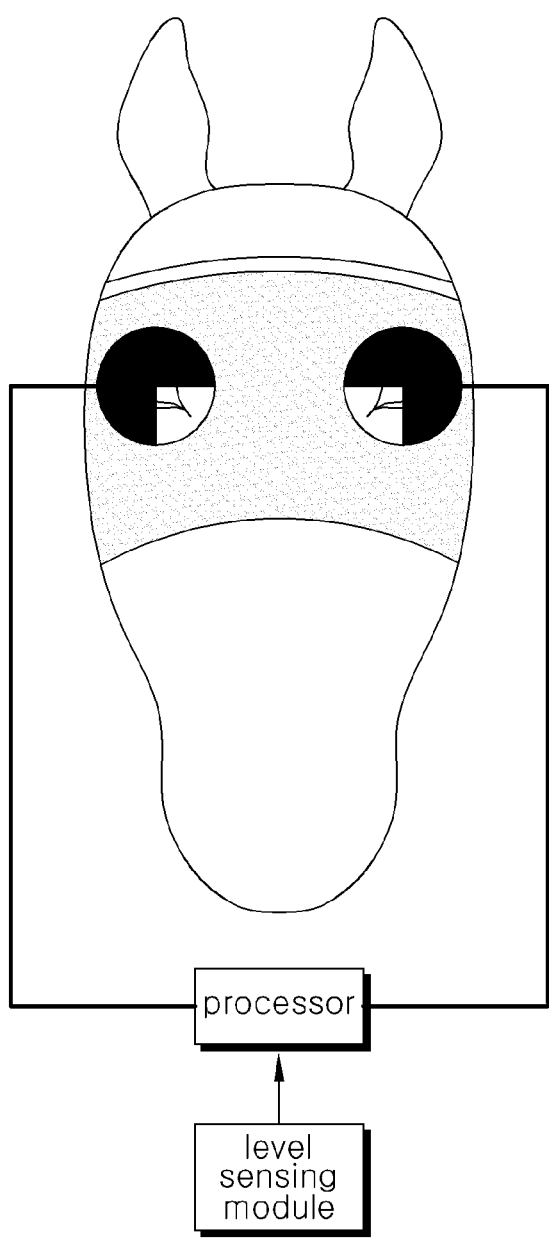
FIG. 8 is a diagram illustrating the configuration of the visual field blocker of the embodiment of FIG. 7.

FIG. 7 is a diagram illustrating the operation of an animal control device according to the third embodiment of the present disclosure. FIG. 8 is a diagram illustrating the configuration of the visual field blocker of the embodiment of FIG. 7.

Referring to FIGS. 7 and 8, an animal control device 12 according to the present embodiment includes sensors 202a and 202b and the visual field blocker 100 controlled by the sensors 202a and 202b, and the sensor 202a and 202b may be sensors for detecting standing up or the like of a target animal.

For example, the sensors 202a and 202b may include the first position sensor 202a and the second position sensor 202b. The first position sensor 202a and the second position sensor 202b may be sensors for measuring relative positions therebetween, specifically, relative altitudes or levels therebetween. FIG. 6 illustrates a case in which the first position sensor 202a is attached to a horse's hind leg and the second position sensor 202b is attached to a horse's saddle, but the present disclosure is not limited thereto. The first position sensor 202a and the second position sensor 202b may be attached to positions that may cause a predetermined altitude difference when the horse stands up. That is, the second position sensor 202b may be located near the forefoot, or neck, or head of a horse.

In another embodiment, each of the first position sensor 202a and the second position sensor 202b may include an inclination sensor function such as a gyro sensor, or may include an inclination sensor function as well as a level sensor function. The first position sensor 202a and the second position sensor 202b may detect the standing up posture of a horse more precisely by measuring the inclination as well as the relative positions. In particular, when the first position sensor 202a is attached to the hind leg of a horse, it is possible to accurately measure the standing up behavior of the horse because the hind leg of the horse is often placed on the ground. For example, it may be configured to decrease the light transmittance of the visual field blocker 100 when the inclination measured by the first position sensor 202a and the inclination measured by the second position sensor 202b are greater than or equal to a predetermined reference, or exceed the predetermined reference.

As described above, when a horse is excited, the horse may take a standing up action, and a serious falling accident is often caused by standing up of a horse. In particular, if the horse stands up and falls, a rider may be crushed to death. Therefore, when a particularly dangerous standing up posture of a horse is detected, the horse's visual field may be blocked to calm down the horse.

Since the animal control method using the sensors 202a and 202b according to the present embodiment is similar to that of FIG. 5 or 6 described above, redundant description thereof will be omitted.

Meanwhile, when the standing up of a horse is detected using the sensors 202a and 202b, the visual field blocker 100 may change the light transmittance of only a partial area. In an exemplary embodiment, it is possible to block the visual field of other areas except a part of the lower area of the animal's visual field. For example, when a horse stands up, it is possible to focus the animal's visual field on the lower side and the inner side by blocking the upper visual field and the outer visual field of the horse, thereby calming down the horse and inducing the horse to lie down on the ground. However, the present disclosure is not limited thereto.

Figure 9:
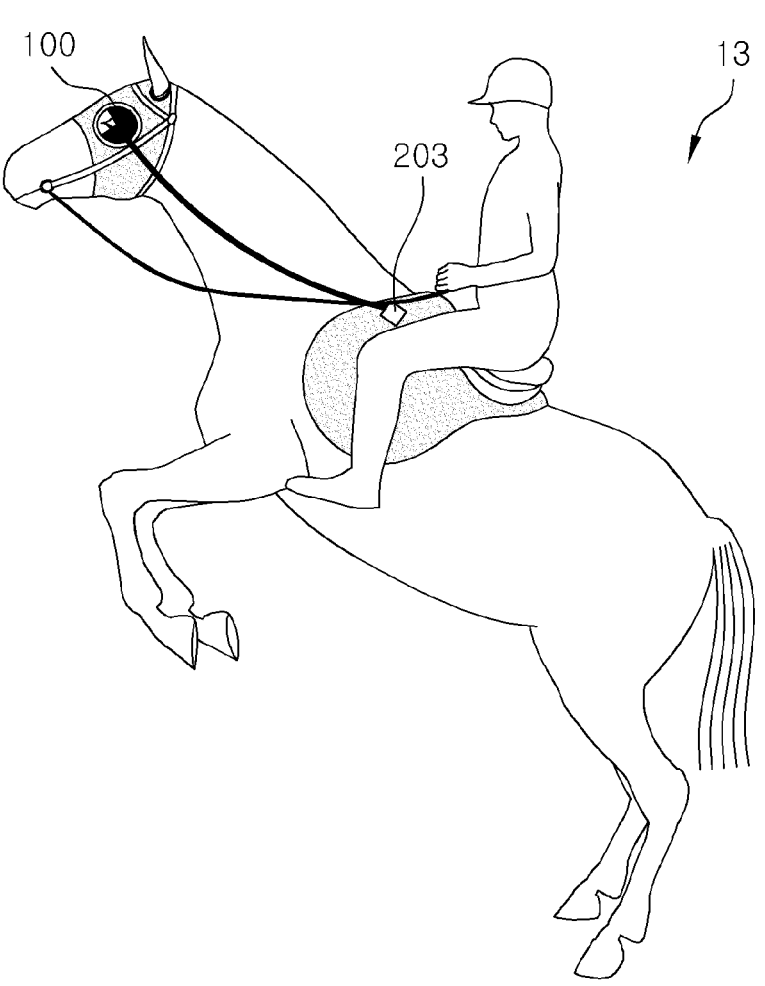
FIG. 9 is a diagram illustrating the operation of an animal control device according to a fourth embodiment of the present disclosure.

FIG. 9 is a diagram illustrating the operation of an animal control device according to a fourth embodiment of the present disclosure.

Referring to FIG. 9, an animal control device 13 according to the present embodiment includes a sensor 203 and the visual field blocker 100 controlled by the sensor 230, and the sensor 203 may be a sensor for detecting standing up or the like of a target animal.

For example, the sensor 203 may be an inclination sensor such as a gyro sensor attached to a horse's saddle or the like. When a horse stands up, the sensor 203 may detect an inclination or angular speed thereof, and control the light transmittance of the visual field blocker 100 based on that. Specifically, it may be configured to decrease the light transmittance of the visual field blocker 100 when the inclination measured by the sensor 203 is greater than or equal to a predetermined reference or exceeds the predetermined reference.

Figure 10:
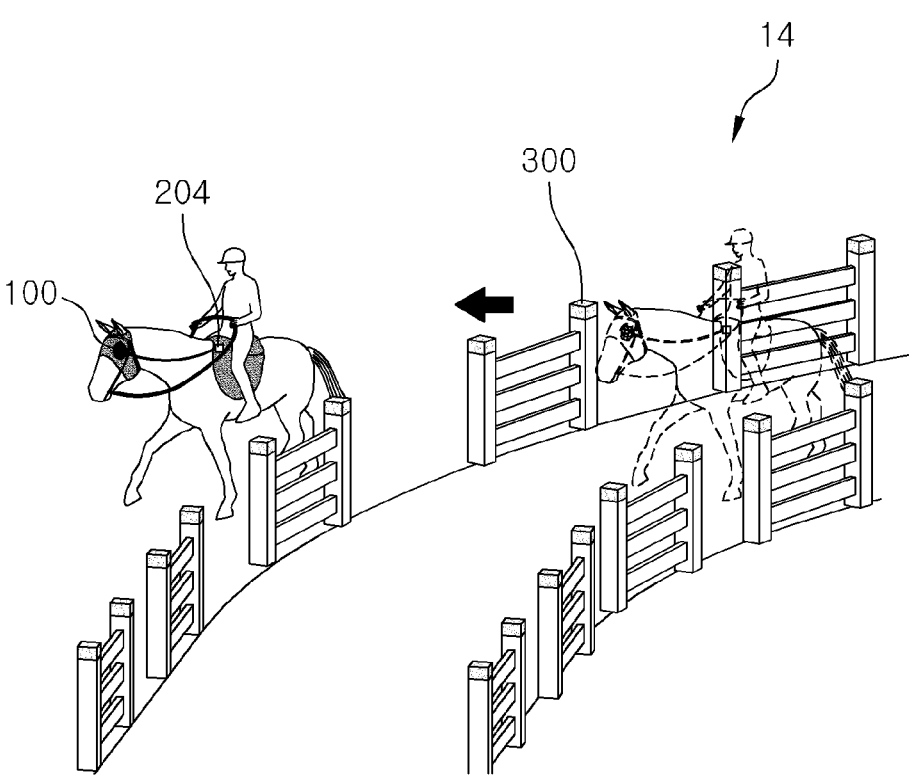
FIG. 10 is a diagram illustrating the operation of an animal control device according to a fifth embodiment of the present disclosure.
Figure 11:
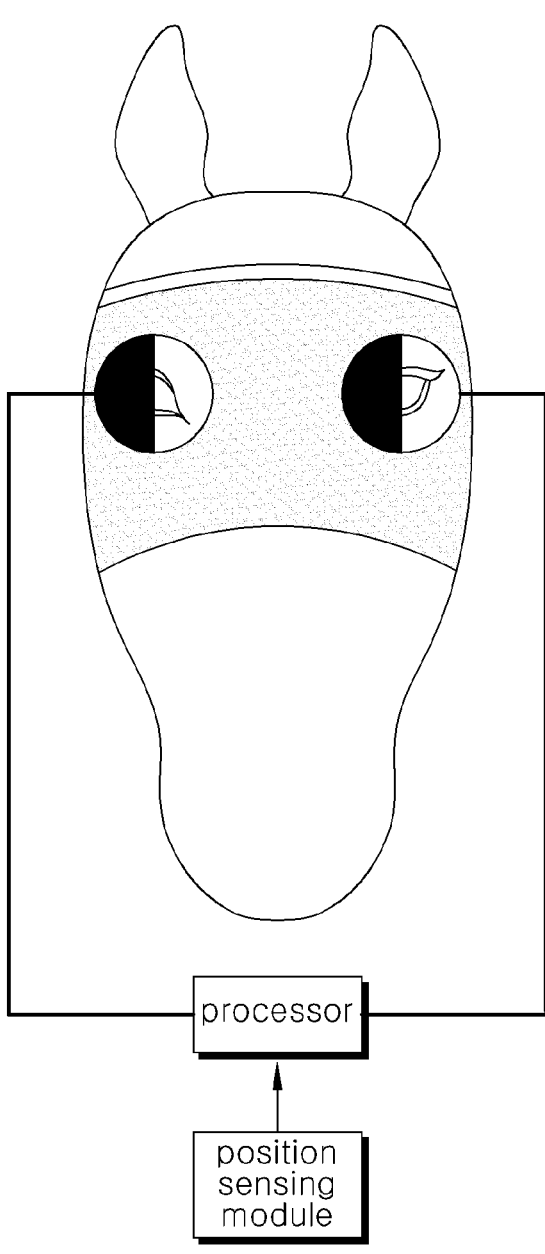
FIG. 11 is a diagram illustrating the configuration of a visual field blocker of the embodiment of FIG. 10.

FIG. 10 is a diagram illustrating the operation of an animal control device according to a fifth embodiment of the present disclosure. FIG. 11 is a diagram illustrating the configuration of a visual field blocker of the embodiment of FIG. 10.

Referring to FIGS. 10 and 11, an animal control device 14 or an animal control system 14 according to the present embodiment may include a sensor 204 attached to a horse and the visual field blocker 100 controlled by the sensor 204, and may further include reference markers 300 or beacons attached to a surrounding structure such as a fence or the like.

In the case of horses, especially training horses, racing horses, competition horses, demonstration horses, or the like, it is common to move them within a fixed zone. That is, it may be unnecessary to move them to a location other than a fixed course. Therefore, the sensor 204 of the animal control device 14 according to the present embodiment may be configured to detect horse's movement and specifically detect a horse's position.

For example, the sensor 204 may move together with the horse while being attached to the horse's saddle or the like, and may determine whether or not the horse deviates from the course in conjunction with the plurality of reference markers 300 attached to the surrounding structure such as a fence or the like. Specifically, the plurality of reference markers 300 communicate with each other to set a fixed area that can be implemented by virtually connecting the reference markers 300, and it may be determined that the horse deviates from the course when the sensor 204 is out of the virtual area. Further, the light transmittance of the visual field blocker 100 may be changed based on such information.

For another example, the sensor 204 may be a location-based measuring device such as a GPS or the like.

Meanwhile, when it is detected that the horse is out of the reference position using the sensor 204, the visual field blocker 100 may change the light transmittance of only a partial area. In an exemplary embodiment, a part of the left visual field and the right visual field of an animal may be blocked. For example, when the horse deviates from the course to one side (e.g., right side), the animal's visual field may be focused on the other side (e.g., left side) by blocking the visual field of other areas except the visual field of the other side (e.g., left side) of the horse, which makes it possible to induce horse's movement to the left side.

For another example, when the horse deviates from the course to the other side (e.g., left side), the animal's visual field may be focused on one side (e.g., right side) by blocking the visual field of other areas except the visual field of one side (e.g., right side) of the horse, which makes it possible to induce horse's movement to the right side.

Figure 12:
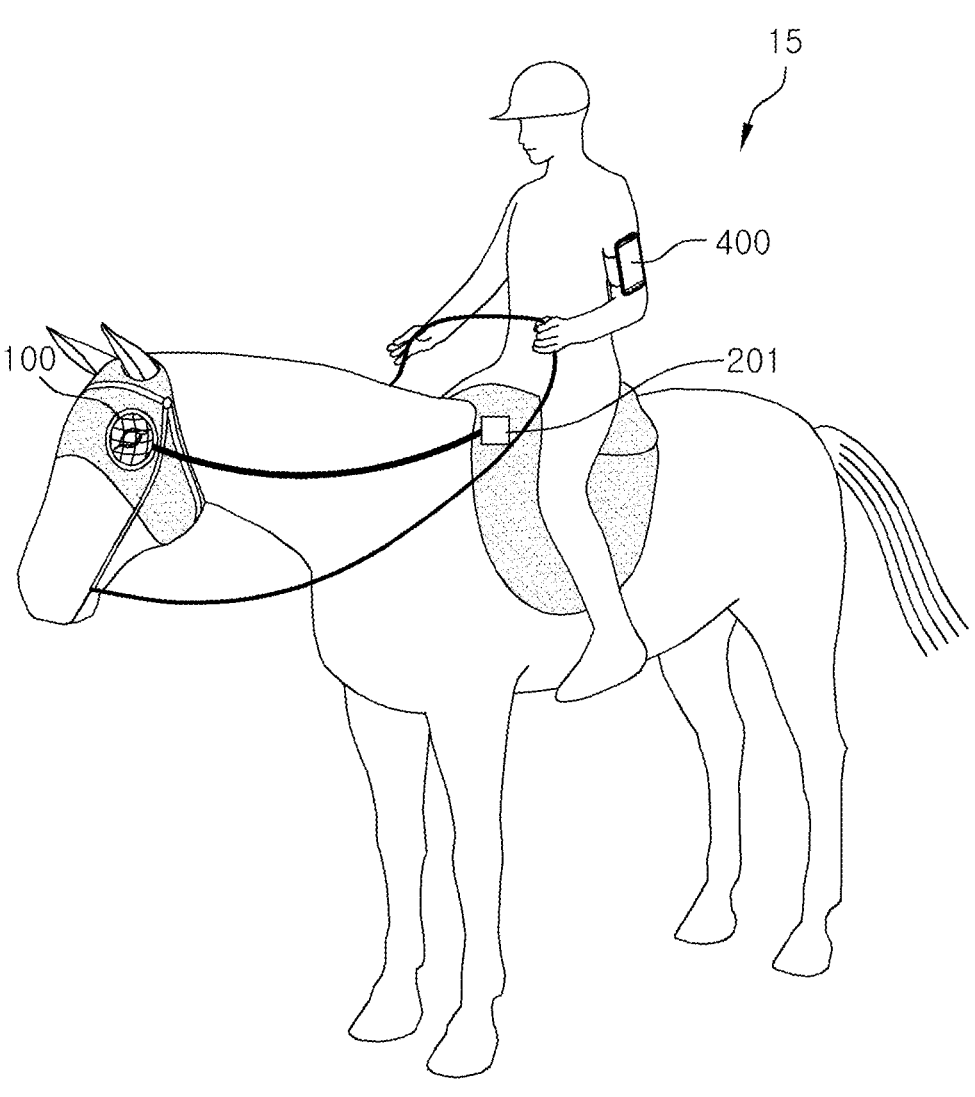
FIG. 12 is a diagram illustrating the configuration of an animal control device according to a sixth embodiment of the present disclosure.

FIG. 12 is a diagram illustrating the configuration of an animal control device according to a sixth embodiment of the present disclosure.

Referring to FIG. 12, an animal control device 15 or an animal control system according to the present embodiment may further include a user terminal 400.

The user terminal 400 may be connected to the visual field blocker 100 through wireless communication including Bluetooth, NFC, wife, or the like. For example, the user terminal 400 and the visual field blocker 100 may be connected in two-way communication only to each other through an identification device such as a unique number or the like. Further, if there is no transmission/reception between the user terminal 400 and the visual field blocker 100 for a certain period of time, the communication may be cut off and a timeout may occur.

The user terminal 400 may implement different modes so that a level may be set to a beginner's level, an intermediate level, and an advanced level according to a test rider's skill level. Further, the user terminal 400 may receive information such as a user's gender, height, weight, age, or the like, and in the above-described embodiment of FIG. 5 or 6, it may be configured to allow a user to arbitrarily set the reference speed, the first reference speed, and/or the second reference speed. That is, the animal control system according to the present embodiment is advantageous in that it is possible to set a unexpected dangerous situation according to a user's setting, and also possible to control an animal more precisely.

For example, if a user is a somewhat experienced rider, the reference speed for driving the visual field blocker 100 may be increased to about 40 km/h or higher. For another example, in the case of a horse trained with horsemanship techniques, the value of the reference inclination may be set to be higher than a predetermined reference such that the horse's visual field is not blocked at the moment of jumping over an obstacle.

For another example, the animal control system 15 may preset a movement restriction area for horses that is implemented in software, and may cause the user terminal 400 to recognize it. The user terminal 400 may display its current location by installing an application and using a location-based service. Further, when the user terminal 400 is out of the permitted movement restriction area, the visual field may be at least partially blocked by controlling the visual field blocker 100.

Although the embodiments have been described above, they are merely examples and not intended to limit the embodiments and it should be appreciated that various modifications and applications not described above may be made by one of ordinary skill in the art without departing from the essential features of the embodiment.

Therefore, it should be understood that the scope of the present invention includes changes, equivalents or substitutes of the technical spirit described above. For example, each component specifically shown in the embodiment of the present invention may be modified and implemented. In addition, it should be understood that differences related to these modifications and applications are within the scope of the present invention as defined in the appended claims.

The invention claimed is:

1. An animal control device comprising:
   a first sensor and a second sensor attached to different positions of an animal, wherein the first sensor and the second sensor are configured to detect their positions, respectively;
   a processor; and
   a visual field blocker configured to block a visual field of the animal, and divided into a plurality of areas, each having a light transmittance which is controllable independently of each other by the processor,
   wherein, when a level difference above a reference value occurs between the first sensor and the second sensor, the visual field blocker is configured to completely block all of the animal's visual field except a part of a lower area of the animal's visual field.

* * * * *